(12) United States Patent
Wang et al.

(10) Patent No.: US 11,569,770 B2
(45) Date of Patent: Jan. 31, 2023

(54) ELECTRIC MACHINE NOISE ATTENUATION

(71) Applicant: Ford Global Technologies, LLC, Dearborn, MI (US)

(72) Inventors: Jiyao Wang, Canton, MI (US); Wei Xu, Canton, MI (US); Silong Li, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 644 days.

(21) Appl. No.: 16/029,908

(22) Filed: Jul. 9, 2018

(65) Prior Publication Data

US 2020/0014318 A1    Jan. 9, 2020

(51) Int. Cl.
*H02P 21/05* (2006.01)
*H02P 21/00* (2016.01)
*B60L 50/51* (2019.01)
*H04R 1/08* (2006.01)

(52) U.S. Cl.
CPC .............. *H02P 21/05* (2013.01); *B60L 50/51* (2019.02); *H02P 21/0003* (2013.01); *H04R 1/08* (2013.01)

(58) Field of Classification Search
CPC ...... H02P 21/05; H02P 21/0003; B60L 50/51; H04R 3/002
USPC .................................................... 318/400.02
See application file for complete search history.

(56) References Cited

U.S. PATENT DOCUMENTS

| | | | |
|---|---|---|---|
| 10,374,539 B2* | 8/2019 | Yamamoto | H02P 21/0003 |
| 2013/0119900 A1 | 5/2013 | Xiang et al. | |
| 2015/0010163 A1* | 1/2015 | Ganeshkumar | H04R 3/002 381/71.4 |
| 2016/0311426 A1 | 10/2016 | Sato | |

FOREIGN PATENT DOCUMENTS

| | | |
|---|---|---|
| CN | 101496277 | 10/2011 |
| JP | 2005117876 | 4/2005 |
| WO | 2015087700 | 6/2015 |

* cited by examiner

*Primary Examiner* — Muhammad S Islam
*Assistant Examiner* — Zemenay T Truneh
(74) *Attorney, Agent, or Firm* — David B. Kelley; Carlson, Gaskey & Olds, P.C.

(57) ABSTRACT

A system for controlling an electric machine of a vehicle includes, among other things, a controller module configured to attenuate noise from the electric machine by altering a corrective voltage in response to feedback about the noise. The corrective voltage and a fundamental voltage command are supplied to the electric machine as a combined voltage command. The corrective voltage is on a harmonic adjacent to a harmonic of the noise. A method of controlling noise associated with an electric machine of a vehicle includes, among other things, altering a corrective voltage to attenuate noise in response to feedback about the noise. The corrective voltage and a fundamental voltage command are supplied to the electric machine as a combined voltage command. The corrective voltage is on a harmonic adjacent to a harmonic of the noise.

21 Claims, 3 Drawing Sheets

ELECTRIC MACHINE NOISE ATTENUATION

TECHNICAL FIELD

This disclosure relates generally to attenuating noise associated with an electric machine and, more particularly, to attenuating audible harmonic noise.

BACKGROUND

Electrified vehicles differ from conventional motor vehicles because electrified vehicles are selectively driven using one or more electric machines powered by a traction battery. The electric machines can drive the electrified vehicles instead of, or in addition to, an internal combustion engine. Example electrified vehicles include hybrid electric vehicles (HEVs), plug-in hybrid electric vehicles (PHEVs), fuel cell vehicles (FCVs), and battery electric vehicles (BEVs).

During operation, an electric machine can produce relatively high-frequency forces in radial and tangential directions. The vibrations can result in audible harmonic noise and audible pulse width modulated noise. The audible harmonic noise cannot filtered as effectively the audible pulse width modulated noise.

SUMMARY

A system for controlling an electric machine of a vehicle according to an exemplary aspect of the present disclosure includes, among other things, a controller module configured to attenuate noise from the electric machine by altering a corrective voltage in response to feedback about the noise. The corrective voltage and a fundamental voltage command are supplied to the electric machine as a combined voltage command. The corrective voltage is on a harmonic adjacent to a harmonic of the noise.

In another non-limiting embodiment of the foregoing system, the noise is audible harmonic noise.

Another non-limiting embodiment of any of the foregoing systems includes at least one microphone that collects the feedback.

Another non-limiting embodiment of any of the foregoing systems includes at least one accelerometer that collects the feedback.

In another non-limiting embodiment of any of the foregoing systems, the feedback comprises audible noise feedback, vibratory feedback, or both.

In another non-limiting embodiment of any of the foregoing systems, the harmonic of the noise is an $n*6^{th}$ order harmonic, and the harmonic of the corrective voltage is an $(n*6^{th})+1$ order harmonic, an $(n*6^{th})-1$ order harmonic, or both.

In another non-limiting embodiment of any of the foregoing systems, the harmonic of the corrective voltage is directly adjacent the harmonic of the noise.

Another non-limiting embodiment of any of the foregoing systems includes an electrified vehicle incorporating the electric machine.

Another non-limiting embodiment of any of the foregoing systems includes the electric machine as a three-phase electric motor.

Another non-limiting embodiment of any of the foregoing systems includes a first current regulator that generates the fundamental voltage command, and a different, second current regulator that generates the corrective voltage.

A method of controlling noise associated with an electric machine of a vehicle according to another exemplary aspect of the present disclosure includes, among other things, altering a corrective voltage to attenuate noise in response to feedback about the noise. The corrective voltage and a fundamental voltage command are supplied to the electric machine as a combined voltage command. The corrective voltage is on a harmonic adjacent to a harmonic of the noise.

Another example of the foregoing method includes collecting the feedback as audible feedback using at least one microphone.

Another example of any of the foregoing methods includes collecting the feedback as vibratory feedback using at least one accelerometer.

In another example of any foregoing methods, the feedback comprises audible noise feedback, vibratory feedback, or both.

In another example of any foregoing methods, the harmonic of the noise is an $n*6^{th}$ order harmonic, and the harmonic of the corrective voltage is an $(n*6^{th})+1$ order harmonic, an $(n*6^{th})-1$ order harmonic, or both.

In another example of any foregoing methods, the harmonic of the corrective voltage is directly adjacent the harmonic of the noise.

Another example of any foregoing methods includes driving an electrified vehicle with torque generated by the electric machine.

In another example of any foregoing methods, the electric machine is three-phase electric motor.

Another example of any foregoing methods includes providing the fundamental voltage command using a first current regulator, and providing the corrective voltage using a different, second current regulator.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure relates generally to reducing audible harmonic noise from an electric machine.

Figure 1:
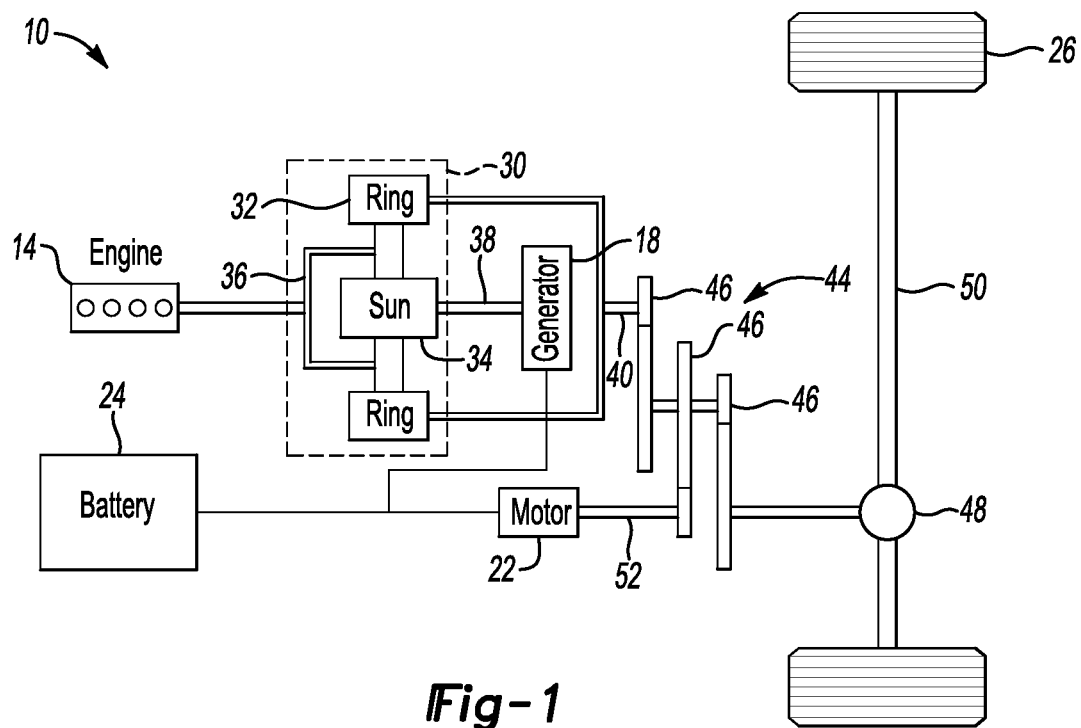
FIG. 1 illustrates a schematic view of an electrified vehicle powertrain incorporating at least one electric machine.

FIG. 1 schematically illustrates a powertrain 10 for an electrified vehicle. Although depicted as a hybrid electrified vehicle (HEV), it should be understood that the concepts described herein are not limited to HEVs and could extend to other electrified vehicles, including, but not limited to, plug-in hybrid electrified vehicles (PHEVs), fuel cell vehicles, and battery electrified vehicles (BEVs).

In this exemplary, non-limiting embodiment, the powertrain 10 is a powersplit powertrain system that employs a first drive system and a second drive system. The first drive system includes a combination of an engine 14 and a generator 18 (i.e., a first electric machine). The second drive system includes at least a motor 22 (i.e., a second electric machine), the generator 18, and a battery 24. In this example, the second drive system is considered an electric drive system of the powertrain 10. The first and second drive systems generate torque to drive one or more sets of vehicle drive wheels 28 of the electrified vehicle.

The engine 14, which is an internal combustion engine in this example, and the generator 18 may be connected through a power transfer unit 30. In one non-limiting embodiment, the power transfer unit 30 is a planetary gear set that includes a ring gear 32, a sun gear 34, and a carrier assembly 36. Of course, other types of power transfer units, including other gear sets and transmissions, may be used to connect the engine 14 to the generator 18.

The generator 18 can be driven by engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In this example, the second power transfer unit 44 is mechanically coupled to an axle 50 through the differential 48 to distribute torque to the vehicle drive wheels 28.

The motor 22 (i.e., the second electric machine) can also be employed to drive the vehicle drive wheels 28 by outputting torque to a shaft 52 that is also connected to the second power transfer unit 44. In one embodiment, the motor 22 and the generator 18 cooperate as part of a regenerative braking system in which both the motor 22 and the generator 18 can be employed as motors to output torque. For example, the motor 22 and the generator 18 can each output electrical power to the battery 24.

The battery may have the form of a high-voltage battery that is capable of outputting electrical power to operate the motor 22 and the generator 18. Other types of energy storage devices and/or output devices can also be used with the electrified vehicle having the powertrain 10.

Figure 2:
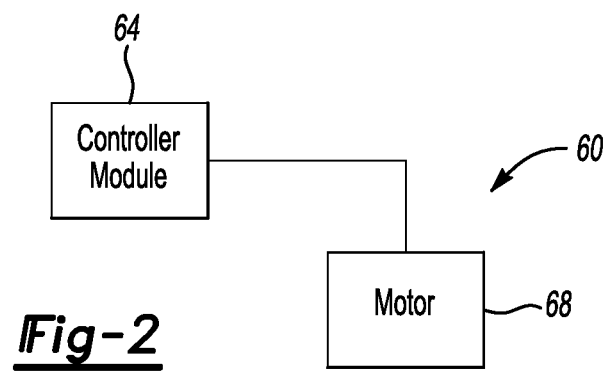
FIG. 2 illustrates a schematic view of an electric machine that can be used within the electrified vehicle powertrain of FIG. 1.

With reference now to FIG. 2, an example electric machine 60 is operably coupled to a controller module 64. The electric machine 60 is a permanent magnet (PM) synchronous motor 68. In general, the electric machine 60 operates in response to a command from the controller module 64. The command can include a voltage command.

The electric machine 60 can be utilized in connection with the powertrain 10 of FIG. 1, or within the powertrain of another type of electrified vehicle that uses a PM synchronous motor. For example, the electric machine 60 could be utilized as the generator 18 in FIG. 1, or as a combined motor-generator. The electric machine 60 could represent some other type of electric machine.

Figure 3:
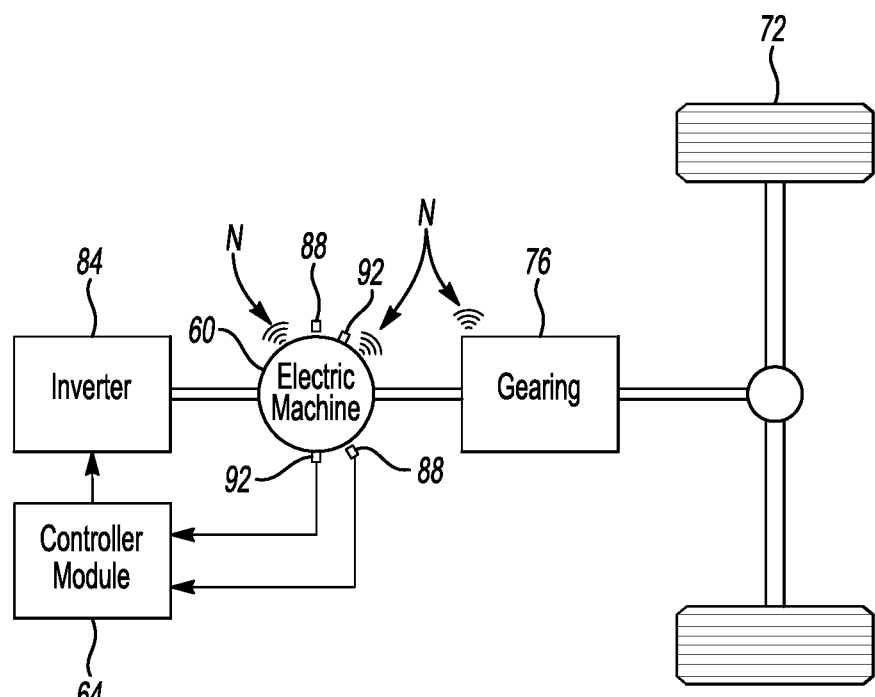
FIG. 3 illustrates a schematic view of the electric machine of FIG. 2 in connection with a system for reducing audible harmonic noise.

With reference now to FIG. 3 and continuing reference to FIG. 2, the electric machine 60 can be used in connection with a powertrain, such as the powertrain 10 of FIG. 1. The electric machine 60 is shown incorporated into a system for reducing audible harmonic noise N from the electric machine 60.

The electric machine 60, in the exemplary embodiment, powers drive wheels 74 through the gearing 76. The audible harmonic noise N originates at the electric machine 60, but can propagate from the electric machine 60 or surrounding components like the gearing 76.

The electric machine 60 is controlled by a command sent from the controller module 64. The command moves from the controller module 64 through an inverter 84 to the electric machine 60. The inverter 84 can be a pulse-width modulation (PWM) inverter.

The audible harmonic noise N can be monitored using at least one microphone 88, at least one accelerometer 92, or both. The audible harmonic noise N may be monitored as audible harmonic noise N from the electric machine 60, or as noise emanating from other areas, such as the gearing 76. The command from the controller module 64 can be altered in response to feedback about the audible harmonic noise N emanating from the electric machine 60.

The microphone 86 detects noise and provides the noise levels to the controller module 64 as a signal. The accelerometer 92 monitors vibrations, which are then provided to the controller module 64 as a signal. The controller module 64 captures the signals and executes an algorithm that attenuates noise from the electric machine 60 based on the signals. That is, the controller module 64 can make adjustments to the command that is sent to the motor 68 based on feedback about the audible harmonic noise N.

In some examples, the microphone 86, the accelerometer 92, or both, are digital devices. The microphone 86 could be a Universal Serial Bus (USB) digital microphone, for example. The use of digital devices can help to reduce a computation burden on the controller module 64 and reduce a required cable length. Analog cables can be replaced by a one digital cable, for example.

The controller module 64 that captures the signals could be a microcontroller unit (MCU). Alternatively, the controller module 64 can include another controller separate from the MCU that is used capture the signals. The other controller could communicate with the MCU through digital channels, for example, Controller Area Network (CAN), Inter-Integrated Circuit (I2C), Serial Peripheral Interface (SPI), etc.

The controller module 64 can include, among other things, a processor and a memory portion. The processor can be programmed to execute a program stored in the memory portion. The processor can be a custom made or commercially available processor, a central processing unit (CPU), an auxiliary processor among several processors associated with the controller module, a semi-conductor based microprocessor (in the form of a microchip or chipset) or generally any device for executing software instructions. The memory portion can include any one or combination of volatile memory elements. The program can be stored in such the memory portion as software code. The programs can include one or more additional or separate programs, each of which includes an ordered list of executable instructions for implementing logical functions associated with making adjustments to the command that is sent to the electric machine 60 based on feedback about the audible harmonic noise N.

Figure 4:
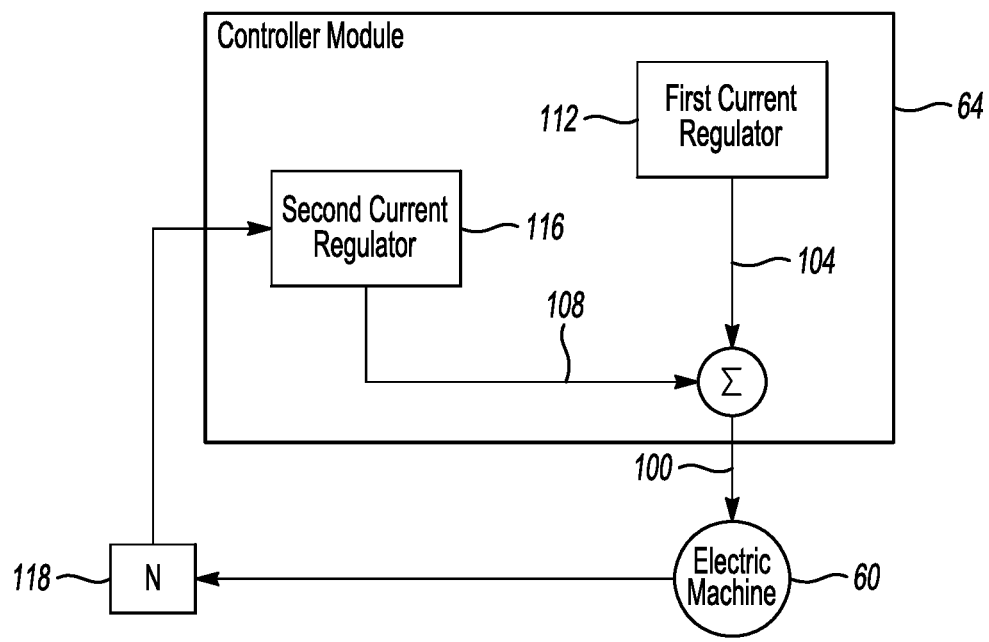
FIG. 4 illustrates another schematic view of the system of FIG. 3.

With reference to FIG. 4, the command sent from the controller module 64 to the electric machine 60 is a combined voltage command 100, which is a combination of a fundamental voltage command 104 and a corrective voltage 108.

The fundamental voltage command 104 is communicated by first current regulator 112 of the controller module 64. The corrective voltage 108 is provided by a separate second current regulator 116 of the controller module 64. The first current regulator 112 and the second current regulator can operator in parallel to provide the fundamental voltage command 104 and the corrective voltage 108, respectively. The combined voltage command 100 is output from the controller module 64 to the electric machine 60.

The controller module 64 can execute a program causing the first current regulator 112 to adjust the fundamental voltage command 104. The fundamental voltage command 104 causes the electric machine 60 to deliver a desired motor torque.

The corrective voltage 108 can be injected onto the fundamental voltage command 104 to provide the combined voltage command 100. The voltage injections for different harmonic orders will not substantially influence each other because they do not share the same frequency, except at zero speed. At zero speed, there is no need to perform active noise attenuation because substantially no audible harmonic noise is produced by the electric machine 60 operating at zero speed.

The controller module 64 executes a program causing the second current regulator 116 to adjust the corrective voltage 108 based on the feedback about the audible harmonic noise N. The feedback is represented at block 118 in FIG. 4 and can be collected and monitored as was described in connection with FIG. 3. The feedback can be fast fourier transform (FFT) feedback about vibrations, audible noise, or some other variable.

In the exemplary embodiment, the corrective voltage 108 is utilized to reduce $n*6^{th}$ order harmonic noise from the electric machine 60. To do so, the second current regulator 116 adjusts the harmonics of the corrective voltage 108 adjacent to the $n*6^{th}$ order harmonic of the noise. Thus, the corrective voltage 108 adjusts an $(n*6^{th})+1$ order harmonic, an $(n*6^{th})-1$ order harmonic, or both. The adjustments to the corrective voltage 108 can include amplitude adjustments and phase angle adjustments.

In the exemplary embodiment, the algorithm of the controller module 80 dynamically changes the corrective voltage 108 and, in particular, the $5^{th}$ and $7^{th}$ order voltages until the feedback indicates that the $6^{th}$ order noise and vibration from the electric machine 60 has reached a reduced value or, in some examples, a minimum value.

In some examples, the second current regulator 116 can adjust harmonics of the corrective voltage 108 adjacent to the $n*12^{th}$ order harmonic to reduce $n*12^{th}$ order harmonic noise from the electric machine 60, the corrective voltage 108 adjusts an $(n*12^{th})+1$ order harmonic, an $(n*12^{th})-1$ order harmonic, or both to attenuate audible noise associated with the $n*12^{th}$ order harmonic.

Figure 5:
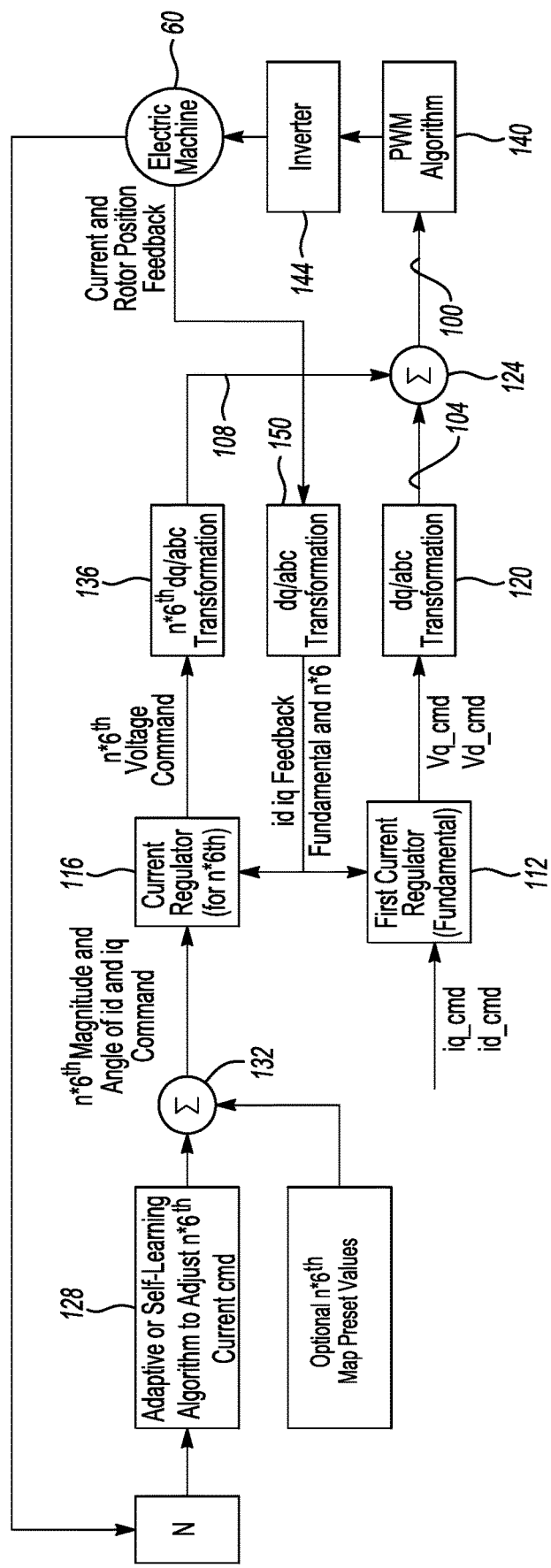
FIG. 5 illustrates a more detailed schematic view of the system of FIG. 4.

With reference to FIG. 5, the first current regulator 112 can receive fundamental command current inputs Iq_cmd and Id_cmd. The first current regulator 112 can output fundamental command voltage outputs Vq_cmd and Vd_cmd, which are transformed at a block 120, and then combined with the corrective voltage 108 at a block 124.

The second current regulator 116 can receive a $n*6^{th}$ magnitude and angle of Id and Iq command, which are provided by an adaptive or self-learning algorithm at the block 128. The algorithm can adjust the magnitude and angle based on information about the audible harmonic noise N from the electric machine 60. The algorithm at the block 128 can refer to a map of preset current values at a block 132, if required.

The second current regulator 116 can output an $N*6^{th}$ voltage command, which is transformed at a block 136, and then combined with the fundamental voltage command 104 at the block 124.

The block 124 provides the combined voltage command 100 to a PWM algorithm at a block 140. From the block 140, the combined voltage command 100 moves to an inverter 144 and then to the electric machine 60.

The voltage command 100 is a control signal. The inverter 144 can only use PWM signal to output electric power. The PWM algorithm 140 converts the control signal 100 into PWM signal, so the inverter 144 can use this PWM signal to generate high power for electric machine 60.

As required, current and rotor position can be transformed at a block 150 and then provided as feedback to the first current regulator 112, the second current regulator 116, or both.

Exemplary features of the disclosed examples include attenuating noise from an electric machine utilizing a corrective voltage, which can reduce the need for noise masking materials. The corrective voltage will not substantially increase electric loss in the motor.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A system for controlling an electric machine of a vehicle, comprising:
   at least one sensor that monitors noise from the electric machine; and
   a controller module configured to attenuate noise from the electric machine by altering a corrective voltage in response to feedback about the noise, the feedback provided by the at least one sensor; wherein the corrective voltage and a fundamental voltage command are supplied to the electric machine as a combined voltage command, wherein the altering of the corrective voltage includes adjusting a harmonic of the corrective voltage that is one more than a harmonic of the noise, adjusting a harmonic of the corrective voltage that is one less than the harmonic of the noise, or both, such that the corrective voltage is adjusted on a harmonic that is directly adjacent to the harmonic of the noise.

2. The system of claim 1, wherein the noise is audible harmonic noise.

3. The system of claim 1, further comprising at least one microphone as the at least one sensor that monitors noise from the electric machine and collects the feedback.

4. The system of claim 1, further comprising at least one accelerometer as the at least one sensor that monitors noise from the electric machine and collects the feedback.

5. The system of claim 1, wherein the feedback comprises audible noise feedback, vibratory feedback, or both.

6. The system of claim 1, wherein the harmonic of the noise is an $n*6^{th}$ order harmonic, and the harmonic of the corrective voltage $(n*6^{th})+1$ order harmonic, an $(n*6^{th})-1$ order harmonic, or both.

7. The system of claim 1, wherein the harmonic of the corrective voltage is directly adjacent the harmonic of the noise.

8. The system of claim 1, further comprising an electrified vehicle incorporating the electric machine.

9. The system of claim 1, wherein the electric machine is three-phase electric motor.

10. The system of claim 1, further comprising a first current regulator that generates the fundamental voltage command, and a different, second current regulator that generates the corrective voltage.

11. A method of controlling noise associated with an electric machine of a vehicle, comprising:
    monitoring noise associated with the electric machine using at least one sensor; and
    altering a corrective voltage to attenuate noise in response to feedback about the noise, the feedback provided by the at least one sensor, the corrective voltage and a fundamental voltage command supplied to the electric machine as a combined voltage command, wherein the harmonic of the noise is an $n*6^{th}$ order harmonic, and the harmonic of the corrective voltage is an $(n*6^{th})+1$ order harmonic, an $(n*6^{th})-1$ order harmonic, or both.

12. The method of claim 11, further comprising collecting the feedback as audible feedback using at least one microphone as the least one sensor.

13. The method of claim 11, further comprising collecting the feedback as vibratory feedback using at least one accelerometer as the at least one sensor.

14. The method of claim 11, wherein the feedback comprises audible noise feedback, vibratory feedback, or both.

15. The method of claim 11, wherein the harmonic of the corrective voltage is directly adjacent the harmonic of the noise.

16. The method of claim 11, further comprising driving an electrified vehicle with torque generated by the electric machine.

17. The method of claim 11, wherein the electric machine is three-phase electric motor.

18. The method of claim 11, further comprising providing the fundamental voltage command using a first current regulator, and providing the corrective voltage using a different, second current regulator.

19. A method of controlling noise associated with an electric machine of a vehicle, comprising:
    communicating a combined voltage command from a control module to the electric machine of a vehicle, the combined voltage command including a fundamental voltage command and a corrective voltage;
    operating the electric machine in response to the combined voltage command, the operating of the electric machine producing noise;
    monitoring the noise using at least one sensor;
    providing feedback to the controller module from the at least one sensor based on monitoring; and
    based on the feedback provided to the controller module, adjusting the corrective voltage within the combined voltage command to attenuate the noise from the electric machine, the adjusting of the corrective voltage including adjusting a harmonic of the corrective voltage that is one more than a harmonic of the noise, adjusting a harmonic of the corrective voltage that is one less than the harmonic of the noise, or both, such that adjusting includes adjusting a harmonic of the corrective voltage that is directly adjacent to the harmonic of the noise.

20. The method of claim 19, further comprising adjusting the fundamental voltage command using a first current regulator, and adjusting the corrective voltage using a different, second current regulator.

21. The method of claim 20, wherein the harmonic of the noise is an $n*6^{th}$ order harmonic, and the harmonic of the corrective voltage is an $(n*6^{th})+1$ order harmonic, an $(n*6^{th})-1$ order harmonic, or both.

\* \* \* \* \*